United States Patent Office 3,210,195
Patented Oct. 5, 1965

3,210,195
PREPARATION OF SPUN PROTEIN
FOOD PRODUCTS
Niles A. Kjelson and John A. Page, Minneapolis, Minn., assignors to General Mills, Inc., a corporation of Delaware
No Drawing. Filed June 26, 1962, Ser. No. 205,239
11 Claims. (Cl. 99—14)

The present invention relates to a process for preparing simulated meat products and to the products prepared by such process. More particularly, it relates to simulated chipped beef type products prepared from spun protein fibers and to the process for preparing same.

Much interest has recently been expressed in the preparation of synthetic food products, especially simulated meats, from spun protein fibers. Such products offer several advantages over natural meats including lower cost, easier handling and packaging, and selection of desired fats or oils and other ingredients. Various cuts of natural meats, such as chicken, ham and the like, have been prepared which closely resemble the natural product as to texture, taste and appearance. However, it has not been possible before the present invention to prepare products which closely simulate conventional chipped or dried beef. The preparation of such products would expand the total utility of simulated meats. Additionally, said products could be marketed in the same manner as the natural meats and also used in combination with various other ingredients in packaged hot dishes and the like.

Therefore, it is an object of the present invention to provide a method for preparing a chipped beef type product from spun protein fibers.

Another object of the invention is to provide a novel synthetic chipped beef type product.

These and other objects will become apparent from the following detailed description.

We have now discovered that simulated chipped or dried beef type products can be prepared by subjecting impregnated and partially set-up spun protein fibers to a simultaneous heating and flattening of ribboning operation. Generally, the process of the present invention comprises: (1) forming a dispersion of edible protein material; (2) forming filaments from said dispersion by precipitation in a coagulating bath; (3) neutralizing said filaments; (4) impregnating the neutralized filaments with binders, flavoring agents and the like; (5) partially setting-up the impregnated filaments by treatment with heat; and (6) subjecting the impregnated and partially set-up filaments to simultaneous heating and flattening or ribboning. Optionally, the set-up and flattened filaments may be (7) dried.

A simplified flow diagram of the above-described process is as follows:

Formation of dispersion of edible material
|
Formation of filaments from said dispersion by forcing same through a porous membrane into a coagulating bath
|
Neutralizing the precipitated filaments
|
Impregnating the neutralized filaments with binders, flavoring agents and the like
|
Partially setting-up the impregnated filaments by treatment with heat
|
Subjecting the impregnated and partially set-up filaments to simultaneous heating and flattening or ribboning
|
Optionally, drying the set-up and flattened filaments The original protein dispersion and the filaments or fibers can be produced by any of the methods known in the art. Thus, a wide variety of protein materials which are edible can be used in preparing the dispersions. Representative of such materials are soybean, safflower, corn, peanut and pea proteins as well as various animal proteins such as casein. The edible protein is dispersed in an alkaline medium in varying amounts, such as from about 10–30% by weight. A suitable alkaline medium is water containing an alkali metal hydroxide, i.e., about 5–10% by weight NaOH. The pH of the spinning solution can vary within relatively wide limits but will generally be in the range of 9 to 13.5. The viscosity and temperature of such dispersions will generally be within the range of about 10,000–20,000 centipoises and about 20–45° C., respectively. Obviously, the viscosity, pH, temperature and concentrations of alkali metal hydroxide and protein will vary somewhat with the particular protein being dispersed. Also, the dispersion may amount to a colloidal solution, and it is understood that the use of either dispersion or colloidal solution in the claims is inclusive of the other.

After formation of the dispersion or spinning dope, it is forced through a porous membrane, such as a spinneret used in the production of rayon, into a coagulating bath which is generally an acid salt soltuion. The streamlets coming through the spinneret are thus precipitated in the form of filaments. The filaments issuing from the spinneret, which is actually a small die having from perhaps 5,000 to 15,000 holes each on the order of 0.003–0.004 inch in diameter, will be of adiameter of about 0.003–0.004 inch. Alternatively, coarser filaments can be produced by starting with the proteins in the form of powdered material and plasticizing them with about 25% alkaline water and then extruding the plasticized protein material through dies. Filaments produced by such a process may be of much greater thickness, on the order of paint brush bristles. It is also possible to have a series of spinnerets producing filaments from the protein dispersion. Such spinnerets may have the same or different number of holes making it possible to directly produce tows of filaments having the same or different diameters.

The coagulating bath is preferably an aqueous solution of salt and an acid. The salt (i.e., NaCl, for example) can be used in widely varying concentrations such as from 0.5 to 12% by weight. The acid can be any of those normally used in the coagulating bath. Representative acidic compounds are acetic acid, lactic acid, citric acid, adipic acid, hydrochloric acid and the like. The concentration of said acid in the bath is not critical and may vary between about 0.5 to 10% by weight.

The filaments or bundles thereof (tows) are then stretched by pulling them from the coagulating bath over a take-away reel. Preferably, stretching tensions of 50–400% are applied to the filaments or fibers. It is understood, however, that higher or lower tensions can be used and also that the stretching can be performed on a series of reels each with an increasing rate of speed or an increased stretching tension. It is further understood that the stretching of the filaments or fibers can take place in a coagulating bath, after emergence thereof from said bath, or partly in the bath and partly after emergence from the bath.

The pH of the filaments or bundles leaving the coagulating bath is generally in the range of about 1.0–4.0 which is undesirable since food products prepared therefrom have a sour taste and are normally too dry and tough. Thus, said filaments are conventionally neutralized by passing them through a neutralizing bath which is normally a salt solution containing an alkali metal hydroxide or bicarbonate. The neutralization is carried out until the pH of the fibers is in the range of about 5.5 to 6.4 which is the pH of most natural meats. However, the pH may generally be in the range of about 4.0 to about 7.0, if desired. The neutralization may also be accomplished by alkaline agents other than the alkali metal hydroxides and bicarbonates. Particularly good results are obtained using aqueous solutions of alkali or alkaline earth metal sulfites. The resulting filaments or fibers and simulated meat products prepared therefrom have an improved flavor and texture. The pH of the fibers can also be raised to the desired range by water washing. However, such procedure may require more handling time and somewhat more processing steps. The terms "neutralizing" and "neutralization" include any method of raising the pH to the desired degree.

The fibers may be aged prior to the described neutralization step. Such fibers in the acid-salt coagulating bath are frequently sold as such before being neutralized. They may have been aged for one week or more, i.e., several months. The use of alkali and alkaline earth metal sulfites is particularly preferred for the neutralization of such aged fibers.

After the neutralization step, the filaments are freed from excess neutralizing solution and impregnated with binders, flavoring agents and the like. The binder preferably consists of, or contains a substantial proportion of, a heat coagulable protein such as albumen. Various meat flavors which are available commercially can be added. Representative thereof are bouillon cubes having beef and other meat flavors. Additionally, various spices and salts can be employed to further flavor the fibers.

Vegetable oils and animal fats and oils can also be added to the fibers. Representative thereof are soybean oil, cottonseed oil, corn oil, coconut oil, palm kernal oil, olive oil, peanut oil, sesame seed oil, safflower oil, tallow, lard, chicken fat, butter, cod-liver oil and the like. The said oils and fats may be partially or fully hydrogenated.

The binder, flavoring agents, oils and fats can be added to the fibers separately. Thus, the fibers can first be passed through a bath containing the binder and, preferably also, the flavoring agents. The fibers can then be passed through a bath of the oil or melted fat. It is also understood that the individual fibers or bundles thereof of different sizes can be treated with the above-described agents to simulate meats of different textures.

The binders, flavoring agents, and oils or fats can be applied to the fibers in a single operation. Thus, the various additives can be emulsified and the fibers passed through said emulsion to provide an even distribution of the binder, fat and flavoring agent in the simulated meat product. An edible emulsifier can be used to prepare the additive emulsion. Representative of such emulsifiers are: mono- and diglycerides of fatty acids, such as monostearin, monopalmitin, monoolein, and dipalmitin; higher fatty acid esters of sugars, such as sucrose partial palmitate and sucrose partial oleate; phosphoric and sulfuric acid esters, such as dodecyl glyceryl ether sulfates and monostearin phosphate; partial esters of glycerol and both higher and lower fatty acids, such as glyceryl lactopalmitate; and polyoxyalkylene ethers of fatty esters of polyhydric alcohols, such as the polyoxyethylene ethers of sorbitan monostearate and sorbitan distearate. The use of an emulsion in impregnating the fibers is particularly advantageous since the fibers are evenly coated with the fat and other ingredients.

Dyes and pigments or other coloring material may also be added to the fibers. The dyes and the like may be added at any stage of the fiber preparation. Thus, they can be added to the spinning dispersion, to the coagulating bath, to the neutralized fibers or preferably at the same time as the other additives.

The fibers prior to impregnation with the above-described materials can also be treated with heat and/or a peroxide to improve the strength and flavor thereof. Additionally, alkali and alkaline earth metal sulfites and bisulfites can be added along with or after the binders, flavoring agents and the like to tenderize the fibers and improve the flavor thereof.

The impregnated fibers are then partially set-up by treatment with heat, such as by baking, boiling, broiling and the like. Preferably, however, said fibers are treated directly with steam. This can be accomplished in a variety of ways. Thus, the fiber tow can be pulled continuously through jets of live steam, or, more efficiently, through a partially enclosed chamber having a steam inlet, such as a steam tower. The tower can be so positioned that the impregnated tow directly from the bath will pass downward through the tower. This is advantageous since the impregnated tow may have a tendency to adhere to the sides of the unlubricated steam chamber. Of course, other tower positions can be used. Thus, if enough tension is placed on the fiber tow, it can be passed horizontally through the tower to yield good results. The length of time which the impregnated fiber tow will be contacted with steam will vary considerably depending on the particular protein used to prepare the fiber, the thickness of the fiber tow, the particular addition agents and the amounts thereof. Good results are obtained with contact times of about ten seconds to thirty seconds. Regardless of the particular heat treatment used, it is essential that the impregnated tow be only partially set-up. If completely set-up, the tow could not be flattened or ribboned in the next step of the process. If no heat treatment is applied prior to the simultaneous heating and flattening operation, there would be loss of impregnating solution and the tow would be difficult to handle. Thus, generally the heat treatment is continued until the impregnated tow is set-up to a point where no substantial loss of impregnating solution is apparent and where the tow can still be flattened or ribboned in the subsequent step of the process.

After the above-described heat treatment, the impregnated and partially set-up tow is subjected to simultaneous heating and flattening or ribboning. This is preferably accomplished by passing the fiber tow through heated revolving rolls. The rolls can be heated to temperatures of about 200 to 400° F. The spacing between the rolls can be varied considerably depending on the desired thickness of the final product. Generally, however, the spacing of the revolving rolls will be such that the fiber tow after passing therethrough will have a thickness of about 0.008 to 0.016 inch. It is understood that the present invention is not limited to the use of revolving rolls. Any apparatus or method which simultaneously heats and flattens the impregnated and partially set-up fiber bundles or tows can be used. Such treatment advances the setting-up of said bundles or tows in addition to the flattening thereof.

The simulated food product, after the described simultaneous heating and flattening operation, can be packaged and sold as such. Optionally, however, the product can be cut into various size pieces and/or dehydrated. The dehydration can be accomplished by any suitable method, such as by vacuum drying at temperatures of about 75 to 150° F. The dehydrated products can be readily rehydrated in boiling water. Such products find use in gravies, soups, hot dish mixes and the like.

A particularly advantageous features of the present invention is that the process can be continuous. Thus, the fibers can be formed, neutralized, impregnated, partially set-up in the steam tower, simultaneously heated and flattened by passage through revolving rolls and/or dried in one continuous operation.

The following specific example is furnished for the purpose of illustration only and is not to be construed as placing any limitations on the scope of the present invention.

*Example*

One hundred grams of an acid-salt soy protein fiber suspension (50% by weight water) which had been aged for at least about seven days was added to 2 liters of an aqueous salt solution (1% NaCl). The initial pH of 3.0–3.5 was raised to a final pH of 5.0–5.5 by the addition of sodium bicarbonate. The fibers were then squeezed through rubber rolls and rinsed in a 1% NaCl solution. They were again squeezed or pressed to remove excess liquid. One hundred parts by weight of the fibers (35–40% by weight solids) were then impregnated with 200 parts of an emulsion made up of the following ingredients:

| Ingredient | Amount (parts by weight) |
|---|---|
| Oil (a lightly hydrogenated mixture of cottonseed and soybean oils) | 50 |
| Glyceral lactopalmitate | 4 |
| Water (hot) | 160 |
| Mono-sodium glutamate | 3 |
| Yellow-onion powder | 18 |
| Brown sugar | 7 |
| Red dye (1% aqueous solution) | 6 |
| Dried egg albumen | 10 |
| Toasted, defatted soybean flour (200 mesh) | 20 |
| Fresh wheat gluten (33% solids) | 90 |
| Salt | 25 |
| Water (cold) | 40 |

The emulsion was prepared by first mixing the oil, hot water, glyceryl lactopalmitate, flavoring agents and dye. Then the albumen, soybean flour and gluten, suspended in the cold water containing the salt, were added thereto with high speed stirring to form a free flowing homogeneous emulsion. The impregnated fiber tow was then passed through the steam tower at such a rate that it was contacted with the steam for approximately 20 seconds. The partially set-up tow was then passed through heated revolving rolls (240° F.) spaced so that the fiber tow upon leaving the revolving rolls was of a thickness of about 0.012 inch. The product after passage through the heated revolving rolls, simulated natural chipped beef to a high degree as to texture, appearance, flavor and eating qualities. It was then dehydrated to about 90% by weight solids in a forced air oven at about 50° C. The eating quality of the product when rehydrated in a noodle type hot dish was much like natural chipped beef.

It is to be understood that the invention is not to be limited to the exact details of operation or the compositions and methods shown and described, as obvious modifications will be apparent to those skilled in the art and the invention is to be limited only by the scope of the appended claims.

The embodiments of the invention in which an exclusive property or privilege is claimed are defined as follows:

1. The process of preparing a fibrous chipped beef type product comprising: (1) forming a dispersion of edible protein in an aqueous alkaline dispersing medium, said dispersion having a pH of 9 to 13.5; (2) forming filaments from said dispersion by forcing the same through a porous membrane into an acid coagulating bath; (3) neutralizing the resulting filaments by raising the pH thereof to about 4.0 to about 7.0; (4) impregnating the neutralized filaments with additive materials selected from the group consisting of binders, flavoring agents, colorants, oils, fats, emulsifiers and mixtures thereof; (5) partially setting-up the impregnated filaments by treatment with heat; and (6) subjecting the impregnated and partially set-up filaments to simultaneous heating and flattening by passing same through revolving rolls heated to about 200 to 400° F. to produce the fibrous chipped beef type product.

2. The process of claim 1 wherein the edible protein is soy protein.

3. The process of claim 1 wherein the filaments are stretched to a degree sufficient to produce an orientation of the molecules thereof.

4. The process of claim 1 wherein the precipitated filaments of step (2) are allowed to age for at least about one week before being neutralized.

5. The process of claim 1 wherein the binder comprises a heat coagulable protein.

6. The process of claim 5 wherein the heat coagulable protein is albumen.

7. The process of claim 1 wherein the impregnation is carried out using an emulsion of the additive materials.

8. The process of claim 1 wherein the heat treating step (5) comprises treating the impregnated fiber tow with steam.

9. The process of claim 1 wherein the set-up and flattened filaments of step (6) are dried.

10. The fibrous chipped beef type product prepared by the process of claim 1.

11. The dried fibrous chipped beef type product prepared by the process of claim 9.

References Cited by the Examiner

UNITED STATES PATENTS

| | | | |
|---|---|---|---|
| 2,682,466 | 6/54 | Boyer | 99—14 |
| 2,785,069 | 3/57 | Dudman | 99—14 |
| 2,813,027 | 11/57 | Galliver et al. | 99—14 X |
| 2,830,902 | 4/58 | Anson et al. | 99—14 |

A. LOUIS MONACELL, *Primary Examiner.*

BEATRICE H. STRIZAK, *Examiner.*